US010824498B2

(12) United States Patent
Kind et al.

(10) Patent No.: US 10,824,498 B2
(45) Date of Patent: Nov. 3, 2020

(54) QUANTIFICATION OF FAILURE USING MULTIMODAL ANALYSIS

(71) Applicant: SAP SE, Walldorf (DE)

(72) Inventors: Jaakob Kind, Heidelberg (DE); Uta Maria Loesch, Ubstadt-Weiher (DE); Atreju Florian Tauschinsky, Walldorf (DE)

(73) Assignee: SAP SE, Walldorf (DE)

( * ) Notice: Subject to any disclaimer, the term of this patent is extended or adjusted under 35 U.S.C. 154(b) by 98 days.

(21) Appl. No.: 16/220,438

(22) Filed: Dec. 14, 2018

(65) Prior Publication Data
US 2020/0192737 A1 Jun. 18, 2020

(51) Int. Cl.
G06F 11/00 (2006.01)
G06F 11/07 (2006.01)
G06F 17/18 (2006.01)
G06N 7/00 (2006.01)

(52) U.S. Cl.
CPC ........ *G06F 11/079* (2013.01); *G06F 11/0766* (2013.01); *G06F 17/18* (2013.01); *G06N 7/005* (2013.01)

(58) Field of Classification Search
CPC .... G06F 11/079; G06F 11/0766; G06F 17/18; G06N 7/005
See application file for complete search history.

(56) References Cited

U.S. PATENT DOCUMENTS

| 7,225,038 | B2 | 5/2007 | Kind |
| 7,551,975 | B2 | 6/2009 | Steinbach et al. |
| 7,617,015 | B2 | 11/2009 | Steinbach et al. |
| 7,894,922 | B2 | 2/2011 | Steinbach et al. |
| 8,275,645 | B2 | 9/2012 | Kind |
| 2005/0071146 | A1 | 3/2005 | Kind |
| 2008/0120129 | A1 | 5/2008 | Seubert et al. |
| 2008/0154411 | A1 | 6/2008 | Steinbach et al. |
| 2008/0154412 | A1 | 6/2008 | Steinbach et al. |
| 2008/0154660 | A1 | 6/2008 | Steinbach et al. |

(Continued)

OTHER PUBLICATIONS

Brick, et al., "Using Statistical Thinking to Solve Maintenance Problems," *Quality Progress*, pp. 55-60 (May 1989).

(Continued)

*Primary Examiner* — Katherine Lin
(74) *Attorney, Agent, or Firm* — Klarquist Sparkman, LLP

(57) ABSTRACT

A method for multimodal failure analysis is provided herein. A multimodal failure analysis request may be received. An asset type may be determined based on the multimodal failure analysis request. Asset records for the asset type may be obtained. The asset records may include data on asset failures across multiple failure modes. A multimodal failure analytical model may be executed based on the asset records. Executing the multimodal failure analytical model may include calculating a distribution of failure intervals over time, probabilities of failure respectively associated with the failure intervals, and intervention scores respectively associated with the failure intervals. An intervention interval and an intervention score associated with the intervention interval may be selected based on the associated probabilities of failure. The selected intervention interval and intervention score may be provided in response to the multimodal failure analysis request.

20 Claims, 9 Drawing Sheets

(56) References Cited

U.S. PATENT DOCUMENTS

| | | |
|---|---|---|
| 2010/0153152 A1 | 6/2010 | Kind |
| 2010/0161366 A1 | 6/2010 | Clemens et al. |
| 2011/0307353 A1 | 12/2011 | Ringl et al. |
| 2016/0146709 A1 | 5/2016 | Dey et al. |
| 2017/0003667 A1* | 1/2017 | Nakabayashi ......... G06Q 10/20 |
| 2017/0091640 A1* | 3/2017 | Song ...................... G06Q 10/04 |
| 2017/0192872 A1* | 7/2017 | Awad .................. G06F 11/3072 |
| 2018/0239662 A1 | 8/2018 | Meusel et al. |
| 2019/0188594 A1* | 6/2019 | Yuan ..................... G06N 7/005 |

OTHER PUBLICATIONS

"Censoring," Chapter 8.1.3.1, *NIST/SEMATECH e-Handbook of Statistical Methods*, available at: https://www.itl.nist.gov/div898/handbook/apr/section1/apr131.htm, 2 pages, created: Jun. 1, 2003, retrieved: Dec. 11, 2018.

"Competing risk model," Chapter 8.1.8.1, *NIST/SEMATECH e-Handbook of Statistical Methods*, available at: https://www.itl.nist.gov/div898/handbook/apr/section1/apr181.htm, 2 pages, created: Jun. 1, 2003, retrieved: Dec. 11, 2018.

Dodson, "Determining the Optimum Schedule for Preventive Maintenance," *Quality Engineering*, 6:667-679 (1994).

Glasser, "Planned Replacement: Some Theory and its Application," *Journal of Quality Technology*, 1:110-119 (Apr. 1969).

"Weibull distribution," Wikipedia, available at: https://en.wikipedia.org/wiki/Weibull_distribution, 11 pages, last updated: Nov. 9, 2018, retrieved Dec. 11, 2018.

* cited by examiner

QUANTIFICATION OF FAILURE USING MULTIMODAL ANALYSIS

FIELD

The present disclosure generally relates to reliability engineering, and improving or optimizing asset intervention intervals, such as for hardware assets. Particular implementations relate to analyzing failure probabilities and scores across multiple failure modes of an asset.

BACKGROUND

System administrators face the problem of determining the best time and manner of maintaining various systems that include one or more assets. Such system administration generally includes determining when and how to perform various interventions. For example, an administrator might consider when to perform actions such as replacing a component of an asset, replacing an asset, or servicing an asset prior to failure. If interventions are performed too early, useful life of an asset or asset component may be wasted. If interventions are performed too late, additional asset damage may occur, or negative side effects of asset failure, such as system downtown, may occur. Thus, the timing and selection of interventions is important. In some cases, analyses may be conducted to help determine when, and what type, of intervention should be applied for a particular type of asset. However, generally, these analyses only consider a single possible type of asset failure, although a particular asset often may have many different types of possible failures. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for multimodal failure analysis is provided herein. A multimodal failure analysis request may be received. An asset type may be determined based on the multimodal failure analysis request. Asset records for the asset type may be obtained. The asset records may include data on asset failures across multiple failure modes. The asset records may be censored. The censoring may include identifying one or more asset records that do not indicate an asset failure. A usage time function may be calculated based on the censored asset records. The calculating of the usage time function may include calculating a first multiple Weibull distribution across the multiple failure modes for the asset type. A score function may be calculated based on the censored asset records. The calculating of the score function may include calculating a second multiple Weibull distribution across the multiple failure modes for the asset type. In some embodiments, the first multiple Weibull function may be the same as the second Weibull function. An intervention interval for which the ratio of the calculated score function to the calculated usage time function is minimal may be determined. An intervention score associated with the determined intervention interval may be determined. The determined intervention interval and intervention score may be provided in response to the multimodal failure analysis request. An action based on the provided intervention interval and intervention score may be taken.

A system for reliability engineering analysis is provided herein, performing a process for multimodal failure analysis. A request for multimodal failure analysis request may be received. An asset type may be determined based on the multimodal failure analysis request. Asset records for the asset type may be obtained. The asset records may include data on asset failures across multiple failure modes for the asset type. A multimodal failure analytical model may be executed based on the asset records. The executing may include calculating a usage time function across the multiple failure modes for the asset type, calculating an intervention score function across the multiple failure modes for the asset type, and determining an intervention time for which the ratio of the calculated intervention score function to the calculated usage time function is minimal. An intervention interval and an intervention score associated with the intervention interval may be selected based on the determined intervention time. The selected intervention interval and intervention score may be provided in response to the multimodal failure analysis request. An action may be taken based on the provided intervention interval and intervention score.

A further method for multimodal failure analysis is provided herein. A multimodal failure analysis request may be received. An asset type may be determined based on the multimodal failure analysis request. Asset records for the asset type may be obtained. The asset records may include data on asset failures across multiple failure modes. A multimodal failure analytical model may be executed based on the asset records. The executing may include calculating a distribution of failure intervals over time, probabilities of failure respectively associated with the failure intervals, and intervention scores respectively associated with the failure intervals. An intervention interval and an intervention score associated with the intervention interval may be selected based on the associated probabilities of failure. The selected intervention interval and intervention score may be provided in response to the multimodal failure analysis request.

The foregoing and other objects, features, and advantages of the invention will become more apparent from the following detailed description, which proceeds with reference to the accompanying figures.

DETAILED DESCRIPTION

Figure 1:
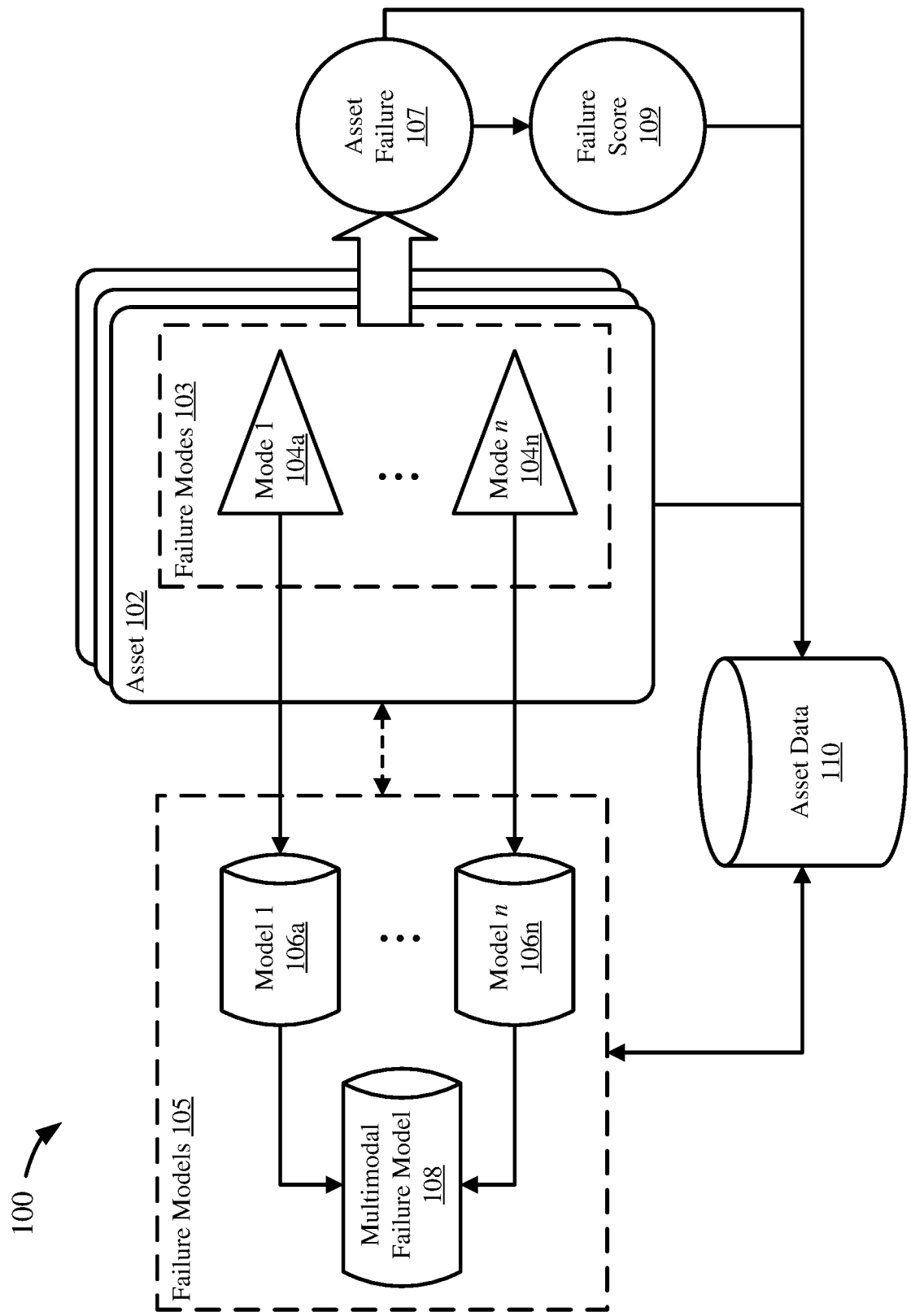
FIG. 1 is a diagram depicting an asset with multiple failure mode modeling.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Multimodal Failure Analysis Overview

According to the present disclosure, failure of an asset may be analyzed or predicted across multiple failure modes, including up to all failure modes, of the asset. An asset may be, for example, a hard disk, a server, a network router, or similar device. Failure may include an asset no longer functioning, no longer functioning correctly, under-performing (such as performing below a given threshold), or requiring maintenance or repair work while still functioning. At one or more times, or perhaps even on an ongoing basis, a system administrator or reliability engineer may want to predict the expected lifetime of an asset, such as a server, and develop an intervention plan accordingly. Because a server can fail in multiple ways, such as a microprocessor failure or a cache memory failure, analyzing multiple failure modes can be important to generating a more accurate prediction of the lifetime of the server, and determining an intervention strategy, such as when to replace the server, replace a component of the server, or perform maintenance on the server. Or, the administrator or engineer may wish to determine whether it may be optimal to simply operate the server until it fails (e.g., failure of the server is less resource intensive than other interventions), at least for that particular server given a user or maintenance history for the particular server. Intervention may include replacement, repairing, maintenance, or some other action take on an asset that may improve the performance, lifetime or usage time, or output of the asset or a similar asset.

As the accuracy of the intervention interval is increased, the extent of resources needed to intervene may be improved or optimized. Resources may include costs, such as an asset cost or component costs, manpower costs, costs associated with downtime, and so on, in addition to other resources, such as assets, parts, contracts, labor, and so on. For example, replacing the server too early increases costs (e.g. resource score or failure score, as described herein) by not utilizing the full lifetime or value of the server. Waiting too long and allowing the server to fail also increases costs—repairing the server may cost less and may have been an option prior to the server failing, but may not be available afterward, or the cost to repair may increase after failure. Further, failure of the server may generate secondary costs, such as loss of availability, loss of data, or loss of network performance, in addition to the cost to replace or repair the server.

Generally, replacing or repairing an asset is more resource-effective prior to failure. However, even in cases where costs remain the same to replace after failure, accurately predicting the intervention interval can improve requisitioning the replacement or repair parts, allowing them to be readily available once the failure occurs, which can minimize downtime or unavailability. Thus, accurately assessing asset lifetime may improve system performance, by allowing timely and controlled intervention (e.g. replacement, repair, or maintenance), and reduce cost by improving or optimizing the asset cost over its lifetime.

Asset records may be maintained for a type of asset (e.g. servers), which may include historic data on asset failures, such as asset age at the failure or failure mode. Such historic asset failure data may be used to analyze the failure rate of the type of asset across the historic asset data, and apply that analysis to a given asset, such as a newly obtained or installed asset. Thus, the lifetime distribution of the asset type failure, across all failure modes, may be determined and used for assessing an intervention interval for the asset. Based on the lifetime distributions of the failure modes and the cost information for failures (which may include not only the replacement or repair costs but also secondary costs like production loss), a planned intervention cost of an intervention strategy for different planned intervention intervals can be determined. A preferred, improved, or optimal (e.g. lowest cost) intervention strategy may then be selected.

Example 2—Asset with Multimodal Failure Model

FIG. 1 is a diagram 100 depicting an asset with multiple failure mode modeling. An asset 102 may be analyzed to determine an intervention plan for the asset, which may include determining the expected lifetime of the asset, or a component thereof.

An asset 102 may have multiple failure modes 103, such as failure mode 1 104*a* through failure mode n 104*n*. The failure modes 103 generally represent the different ways in which the asset 102 might fail. One or more of the failure modes 103 may lead to asset failure 107. Asset failure 107 may include the asset ceasing to function, in whole or in part, or functioning incorrectly, in whole or in part. Generally, asset failure 107 has an associated failure score 109. The failure score 109 may include an indication of the degree of resources needed to intervene, or the cost to intervene with (e.g. repair or replace) the asset 102, and may include secondary costs, such as loss of productivity of the asset (e.g. server downtime).

An asset 102 may have asset data 110. Asset data 110 may include information about the asset 102, such as an asset type or the failure modes 103 for the asset. The asset data 110 may further include data about an asset failure 107, or include records of all previous failures of the asset, which may include lifetime of the asset at failure or the mode of failure. The asset data 110 may also include the failure score 109 for an asset failure 107, or include the failure score of each of the previous asset failures (e.g. may include the failure score as part of a previous asset failure record). The asset data 110 may be stored in a database or other data management system. The asset data 110 may be combined with asset data for other similar assets 102, such as the same type of assets.

An asset 102 may be associated with one or more failure models 105. The failure models 105 may describe the lifetime of the asset 102. For example, the failure models 105 may describe the likelihood of asset failure for a given failure mode of the asset at various time intervals.

Separate failure modes 103 may be associated with separate failure models 105. For example, failure mode 1 104*a* may be described by failure model 1 106*a*, while failure mode n 104*n* may be described by failure model n 106*n*, and so on. Failure model 1 106a through model n 106n may be different models (e.g. different mathematical models) or they may be the same model using separate data sets from the asset data 110. Such separate data sets may be data sets limited to asset failures for the particular failure mode. For example, model 1 106a may use a data set from the asset data 110 limited to asset failures 107 by mode 1 104a.

Failure models 105 for the separate failure modes 103, such as model 1 106a representing mode 1 104a, may be unified or represented by the multimodal failure model 108. The multimodal failure model 108 may describe all asset failures 107 for all failure modes 103 of the asset 102, or can use a subset of multiple failure modes (provided that more than one failure mode is included in a common analysis). The multimodal failure model 108 may utilize the entirety of the asset data 110 for the asset 102, or for assets of a same type, at least as relevant for the failure modes to be analyzed, and so provide a complete representation of the predicted lifetime of the asset, and failure scores associated with the asset.

Multiple assets 102 of the same type (e.g. a server, a microprocessor) may be used together in the failure models 105, as described herein. As for a single asset 102, multiple assets may have multiple failure models 106a-n, which may be integrated together in a multimodal failure model 108. Thus, a single multimodal failure model 108 may incorporate multiple failure modes 104a-n for multiple assets 102, as further described herein.

Example 3—Multimodal Failure Analyzer I/O

Figure 2:
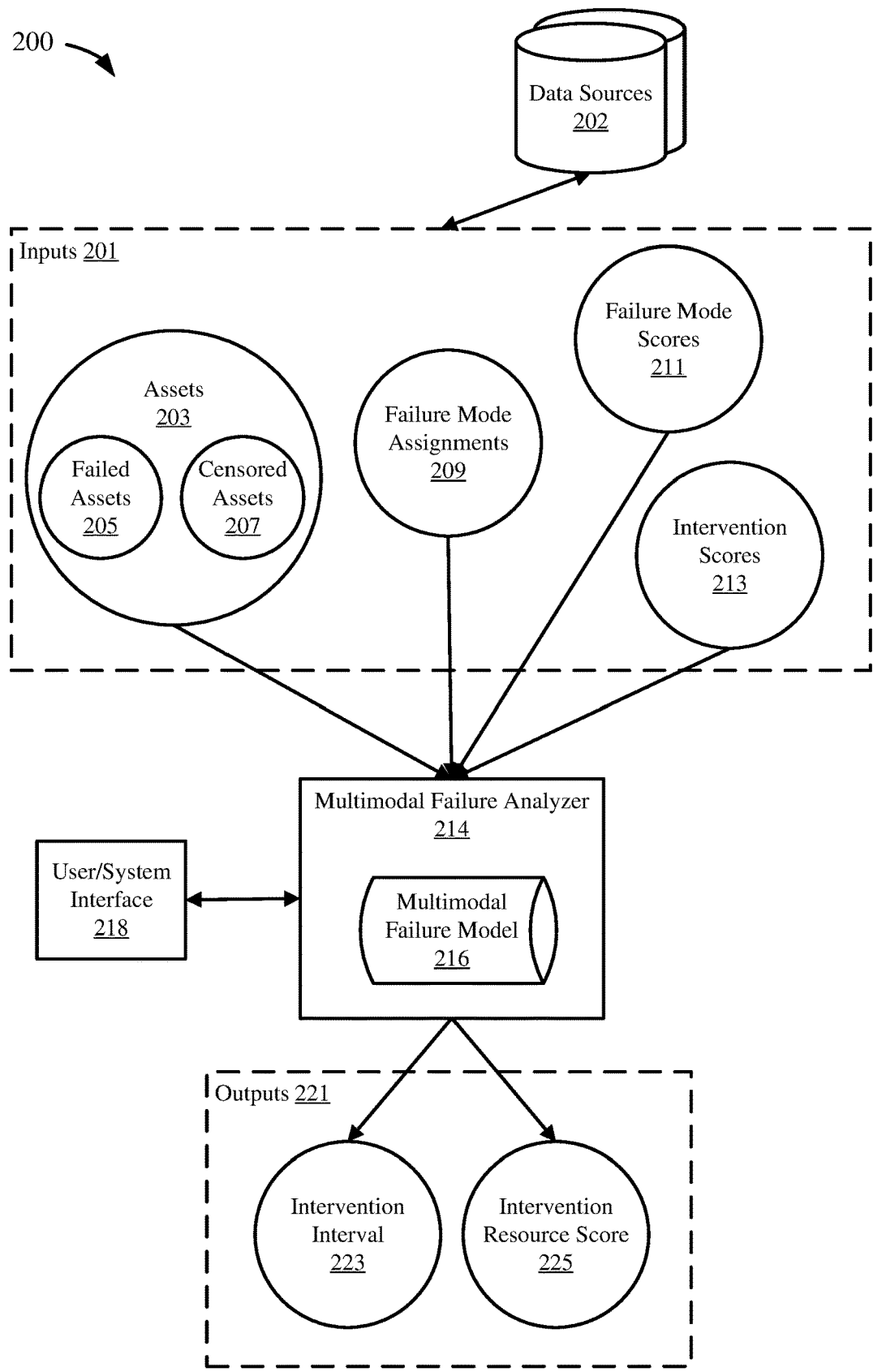
FIG. 2 is a diagram depicting a multimodal failure analyzer inputs and outputs.

FIG. 2 is a diagram depicting a multimodal failure analyzer system 200. A multimodal failure analyzer 214 may include a multimodal failure model 216. The multimodal failure model 216 may be used by the multimodal failure analyzer 214 to perform failure analysis for an asset, as described herein. The multimodal failure analyzer 214 may analyze a given asset or asset type using the multimodal failure model 216.

The multimodal failure analyzer may receive one or more inputs 201. The inputs 201 may be received or obtained from one or more data sources 202. The inputs 201 may be historical asset data, such as asset data 110 shown in FIG. 1, which may be stored in the one or more data sources 202.

The inputs 201 may include assets data 203, failure mode assignments 209, failure mode scores 211, and intervention scores 213. The assets data 203 may include historical asset records which may include failed assets 205, which may be those assets which have failed previously, and censored assets 207, which may be those assets which have not yet failed (or have no record of failure in the data sources 202). Generally, the assets data 203 will be the same type of asset, or a comparably similar type of asset.

The failure mode assignments 209 may be data for the modes of failure for the failed assets 205. A particular failure mode assignment may be associated with a particular failure of a particular failed asset.

The failure mode scores 211 may be data, such as historical data, for the resource usage correlated with the failure mode assignments 209. A particular failure mode assignment 209 may be associated with a particular failure mode score 211. Additionally or alternatively, a particular failure mode score 211 may be associated with a particular failure of a particular failed asset 205.

The intervention scores 213 may be data, such as historical data, for the resource scores of intervening with an asset 203. A particular intervention score 213 may be associated with a particular asset 203. The intervention scores 213 may be estimated or projected intervention scores of the asset 203, or the intervention scores may be historical intervention scores for failed assets 205, or may include censored assets 207 in some embodiments. Generally, the intervention scores 213 are scores (e.g. costs) for a planned intervention (e.g. before failure), but may be the intervention scores after a failure. For example, an intervention score may be a known value determined from a failure of an asset, or an intervention score may be a predicted value calculated based on a failure model (e.g. multimodal failure model as described herein). In some embodiments, an intervention resource score 225 for both a planned intervention and an intervention after failure (which is generally unplanned, as the exact time of failure is not known) may be determined.

In some embodiments, the intervention scores 213 for the assets 203 may be combined to form a single intervention score. Such a single intervention score may be provided as an input (e.g. in place of intervention scores 213) to the multimodal failure analyzer 214, or may be calculated by the multimodal failure analyzer based on the intervention scores 213. A combined single intervention score may be an average of the intervention scores 213, or may be calculated by another formula that provides an expected score value.

The multimodal failure analyzer may generate one or more outputs 221. The outputs 221 may be discrete values, or may be ranges of values or data sets. In some embodiments, the outputs 221 may be provided as data objects, or references to data objects. The outputs 221 may include an intervention interval 223 and an intervention resource score 225. The intervention interval 223 as well as the intervention resource score 225 may be for replacement, maintenance, or repair work, as examples.

The intervention interval 223 may be a recommended time interval to replace, repair, maintain, or otherwise intervene with the asset or asset type analyzed by the multimodal failure analyzer. Alternatively or additionally, the intervention interval 223 may be the predicted time interval for the failure of the analyzed asset or asset type. Generally, the intervention time interval 223 is the time interval with the lowest associated intervention resource score as calculated (e.g. the optimized resource score).

The intervention resource score 225 may be an estimated or predicted resource score to intervene with the asset or asset type analyzed by the multimodal failure analyzer, during the provided intervention interval 223. The intervention resource score 225 may include the cost to intervene, such as cost of a replacement asset or cost to repair, or may be a numerical value representing a total impact on intervention, such as including downtime or other resource usage.

The multimodal failure analyzer 214 may have a user or system interface 218. The interface 218 may provide access to the multimodal failure analyzer 214, such as by a user or by a computing system. For example, a user interface 218 may allow a user to input an asset or asset type, which may be passed to the multimodal failure analyzer 214 for analysis. Similarly, a system interface 218, such as an API, may be provided to allow a computing system to pass a multimodal failure analysis request to the analyzer 214. In some embodiments, the multimodal failure analyzer 214 may be a program library with multimodal failure analysis functions.

In some embodiments, the multimodal failure analyzer 214 may be integrated, in whole or in part, with the user or system interface 218. In such embodiments, the inputs 201 or outputs 221, or both, may be received or provided through the interface 218.

Example 4—Process for Multimodal Failure Analysis

Figure 3:
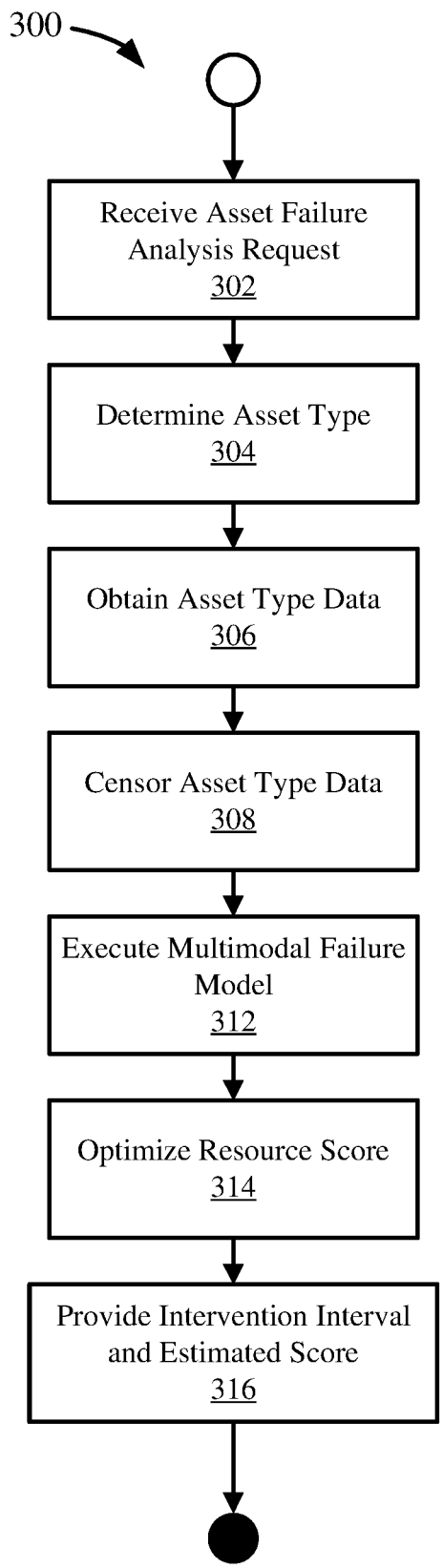
FIG. 3 is a flowchart illustrating a process for multimodal failure analysis.

FIG. 3 is a flowchart illustrating a process 300 for multimodal failure analysis. The process 300 for multimodal failure analysis may be provided as a software application or system, a service (e.g. SaaS), or may be incorporated into another process, another program, or another system. The process 300 for multimodal failure analysis may be integrated, in whole or in part, into a multimodal failure analyzer, as described herein.

A request for asset failure analysis may be received at 302. The request may include an asset to analyze, which may be, for example, a reference to the asset, such as an asset identifier, or a data object representing the asset. In some cases, the request at 302 may include multiple assets, of the same or similar type, to analyze. Alternatively or additionally, the request may include a type of asset to analyze (e.g. a server, a hard disk). In some embodiments, the request may include an indicator, such as a flag, for performing multimodal analysis, such as in place of single mode analysis.

The request may be received at 302 from a user interface. Alternatively, the request may be received through an Application Program Interface (API), such as between programs or across a network, or through a microservices message queue, or otherwise between programs or systems.

The asset type may be determined at 304. Determining the asset type at 304 may include extracting the asset type from the asset failure analysis request received at 302. For example, the asset type may be a field in the request, which may be thus obtained from the request. Alternatively, the asset type may be a field in a data object for the asset, which may be received as part of the request at 302. In such an embodiment, the asset type may be obtained from the data object. If an identifier for the asset is provided, the object identifier may be used to access data about the asset, such as the asset type. For example, an identifier for a record representing the asset in a database may be provided in the request, and the database may be queried at 304 to obtain the asset type for the asset.

The asset type may be a broad type that encompasses many different assets, such as "microprocessor" or may be a narrow type specifying a very particular set of assets, such as "CORE i7" (product series name) or "Intel CORE i7-9700k" (product line name), or something in-between. Asset type may be used to determine the set of data used for the multimodal failure analysis. Accuracy of the analysis may be adjusted based on the broadness or narrowness of the asset type, which may be balanced by availability of data for a given asset type. For example, 1,000 data records may be available for asset type "microprocessor," but only 90 records available for "Intel CORE i7" and 8 records for "Intel CORE i7-9700k." Thus, the asset type may be used to adjust the multimodal failure analysis based on data availability.

Asset type data may be obtained at 306. Obtaining asset type data at 306 may include accessing one or more data sources to obtain the data records for the asset type determined at 304. The one or more data sources may be local or remote data sources, or a combination thereof (e.g. accessing both a remote and a local data source). Generally, accessing a data source may include executing a query against the data source, which then returns the requested asset type data. Obtaining asset type data at 306 may further include generating or formatting a query for execution against a data source to obtain the data records based on the asset type.

Asset type data may include historical failure data for one or more assets of the asset type determined at 304. In some embodiments, the asset type data includes a set of assets having the same asset type, and generally includes data for any failures (zero or more) of each asset, which may further include the asset age at failure and the mode of failure. Such data may additionally or alternatively include an indicator that a given asset has not failed. The asset type data may include the multimodal failure analyzer 214 inputs 201, as shown in FIG. 2.

In some embodiments, determining the asset type at 304 may be combined with obtaining the asset type data at 306. For example, a single query may be generated and executed against a database to obtain the asset type data based on the asset type of an asset identifier provided in the asset failure analysis request from 302.

Asset type data may optionally be censored at 308. Censoring the obtained asset type data at 308 may include removing or otherwise excluding assets with no failures or no failure history from analysis. For example, a flag or other indicator may be set for assets with no failure history in the obtained asset type data, indicating that the asset should not be used in the failure analysis. In other embodiments, an asset with no failure history may be removed entirely from the asset type data. In some embodiments, the asset type data may be censored when stored, and so is already censored when obtained at 306 (e.g. censored assets may not be available to obtain, or may be obtained with a censor flag already set).

A multimodal failure model, as described herein, may be executed at 312. Executing a multimodal failure model at 312 may include accessing, activating, or otherwise engaging a multimodal failure analyzer, as described herein. Generally, such a multimodal failure model may be executed on the obtained and censored asset type data. Executing a multimodal failure model at 312 may include processing the asset type data obtained at 306 through one or more equations or formulas that define the multimodal failure model, such as described herein. Processing asset type data through such equations may create or estimate a particular data model for the asset type based on the asset type data (or, if updating the multimodal failure model with new data, may train the data model). Thus, executing the multimodal failure model at 312 may create a specific data model instantiated based on the obtained asset type data.

The multimodal failure model may be implemented as a multiple Weibull distribution. Generally, the inputs to the multiple Weibull distribution may include the lifetime (or survival time) of an asset with a corresponding failure mode, and right-censored lifetime observations (without failure mode). The separate failure modes may estimate the distribution parameters independently or separately. Further, generally only failures of a given failure mode are considered for that failure mode. The multiple Weibull distribution may be represented by the following equation:

$$F_n(t, K, \Lambda) = 1 - \prod_{i=1}^{n} (1 - F(t, k_i, \lambda_i)) \quad (1)$$

Where n is the total number of failure modes and i is a given failure mode, k is the shape parameter (k is the set of shape parameters for the separate failure modes, $k_1$ to $k_n$), $\lambda$ is the scale parameter ($\Lambda$ is the set of scale parameters for the separate failure modes, $\lambda_1$ to $\lambda_n$), and t is the time parameter (survival time or lifetime). The function $F(t, k_i, \lambda_i)$ is further defined below, as equation (3).

A shape parameter, k, may be determined based on the inputs to the multiple Weibull distribution as described herein (e.g. the lifetime or survival time of assets). The shape parameters (e.g. the values in set k) may be determined based on a fit function, such by using a (singular) Weibull distribution or a maximum likelihood estimator. Calculating the shape parameters k may be included as part of executing the multimodal failure model at 312.

A scale parameter, $\lambda$, may be determined based on the inputs to the multiple Weibull distribution as described herein (e.g. the lifetime or survival time of assets). The scale parameters (e.g. the values in set $\Lambda$) may be determined based on a fit function, such by using a (singular) Weibull distribution or a maximum likelihood estimator, similarly as for the shape parameter. Calculating the scale parameters $\Lambda$ may be included as part of executing the multimodal failure model at 312.

The multiple Weibull distribution (1) may have the following probability density function:

$$f_n(t, k, \Lambda) = F_n(t, k, \Lambda) \sum_{i=1}^{n} \frac{f(t, k_i, \lambda_i)}{1 - F(t, k_i, \lambda_i)} \quad (2)$$

The function $F(t, k_i, \lambda_i)$ may be the following Weibull distribution equation:

$$F(t,k,\lambda) = 1 - e^{-(t/\lambda)^k} \quad (3)$$

The Weibull distribution (3) equation may have the following probability density function:

$$f(t, k, \lambda) = \frac{k}{\lambda}\left(\frac{t}{\lambda}\right)^{k-1} e^{-(t/\lambda)^k} \quad (4)$$

The Weibull distribution equation (3) may also have the following hazard rate function:

$$h(t, k, \lambda) = \frac{k}{\lambda}\left(\frac{t}{\lambda}\right)^{k-1} \quad (5)$$

The multimodal failure model may include the multiple Weibull distribution function, and other associated equations as described herein. Executing the multimodal failure model may include executing some or all of the equations as described herein. Executing the multimodal failure model generally results in a set of time intervals in which an asset of the determined asset type may fail, and the probability of failure at each of those time intervals.

The intervention (e.g. repair or replacement) resource score may be optimized at 314. Optimizing the intervention resource score may include accessing, activating, or otherwise engaging a multimodal failure analyzer, as described herein. Generally, optimizing the intervention resource score may be calculated on the obtained and censored asset type data, or results data from the executed multimodal failure model. In some embodiments, optimizing the intervention resource score at 314 may be integrated with executing the multimodal failure model at 312.

The optimized intervention resource score may be calculated through an expected resource score equation and an expected lifetime, or usage time, equation. Such equations may be predicated on an average resource score of a planned intervention being 1, and an average resource score of an unplanned intervention, because of failure from failure mode i, may be designated as $c_i$. Such equations may further be predicated or integrated with the multiple Weibull distribution equations, as described herein. The expected resource score equation (or scoring function), for multimodal failure analysis, may be represented by the following equation:

$$C(t) = \int_0^t \frac{\sum_{i=1}^{n} c_i h(x, k_i, \lambda_i)}{\sum_{i=1}^{n} h(x, k_i, \lambda_i)} f_n(x, k, \Lambda) dx + 1 - F_n(t, k, \Lambda) \quad (6)$$

The expected lifetime (e.g. usage) equation, for multimodal failure analysis, may be represented by the following equation:

$$U(t) = \int_0^t x f_n(x, k, \Lambda) dx + t(1 - F_n(t, k, \Lambda)) \quad (7)$$

The expected resource score equation and the expected lifetime equation may be utilized to calculate the optimal usage time as follows:

$$\frac{C(t)}{U(t)} \quad (8)$$

The optimal usage time is generally the value of t for which the combined equation (8) above is minimal. The multimodal failure model and resource score equations may be solved numerically. Generally, the optimal usage time is finite where k>1 is true for at least one failure mode.

In some embodiments, further asset data may be integrated into the multimodal failure model when executed at 312 and optimized at 314. For example, additional factors may include asset usage level, "up-time" or availability, asset age, previous asset interventions or service history, and so on.

The calculated intervention interval (e.g. expected lifetime or usage time) and the associated optimized intervention resource score may be provided at 316. Generally, the intervention interval and the intervention resource score are provided together, but in some embodiments only one or the other may be provided, or they may be provided separately. The intervention interval and intervention resource score may be provided as data values, such as return values from a function call or a service call (e.g. SaaS), or may be provided in a user interface, as described herein.

The intervention interval and resource score values may be provided as singular discrete values, giving only the optimized time interval and resource score, or the distribution results for the intervention interval or the intervention resource score may be provided, in whole or in part. For example, the intervention intervals and associated probabilities may be provided for data visualization, such as in data analysis software, to allow a user to review the entire result set, including the optimized results.

Providing at 316 may also include generating a report or schedule with the intervention interval and estimated resource score. Further, providing at 316 may include generating a visualization of the distribution of intervention intervals and associated probabilities and estimated resource scores, in whole or in part. Such visualization may include functionality to allow selection of a preferred intervention interval or estimated resource score, such as by a user.

In further embodiments, one or more actions may be taken based on the intervention interval and estimated resource score provided at 316. For example, such actions may be automatically ordering a replacement asset, or parts for repairing the asset, or scheduling such an order. Alerts may be scheduled to notify a system administrator or reliability engineer to inspect the asset based on the provided intervention interval.

Rules may be developed, and may be user-configurable, for taking specific actions based on the provided intervention interval or estimated resource score (or other related calculated values, such as the probability densities or hazard rate). Such actions may be taken automatically based on the rules, or may prompt a user to confirm or take the action. For example, a replacement part or asset may be ordered if the intervention interval is smaller (e.g. sooner) than a given value or threshold. An alert or prompt may be provided to a user or administrator if the estimated resource score is above a score threshold. An action may be selected based on additional factors as well, such as asset age or a maintenance schedule. For example, an action taken for a 5 year old server may be different than for a 10 year old server.

Similar rules may implement a dynamic intervention interval determination. Additional factors or rules may be established to adjust the intervention interval, such as current resource availability. Surplus resources or limited resources may shift the resource interval to be sooner or later. An intervention interval may be adjusted, as an action, from an optimized interval to the closest already-scheduled maintenance interval. Obtaining resources, such as a replacement asset or parts, may be scheduled based on the intervention interval in addition to marketplace costs changing for the parts (e.g. price drops within a year of maintenance may trigger resource acquisition).

Example 5—Right- and Left-Censored Inputs

Inputs to a multiple Weibull distribution may be right-censored inputs, as stated previously. In some cases, a right-censored input is an observation of the lifetime (or survival time) of an asset that has not yet failed observed at the time of parameter estimation (e.g. data input or execution of the data model). This is because it is known, for an object that has not failed, that its lifetime is at least the current time. Such right-censored inputs may be done for each failure mode. For example, for an asset with two failure modes A and B, and that fails at 1 year for failure mode A without failing under failure mode B, it can be determined that failure mode B has a survival time of at least 1 year. Thus, the one year may be used as a survival time input for failure mode B (as well as for failure mode A). Such right-censored inputs may also be used for assets that have not yet failed under any failure mode. A right-censored input may be considered to be a lower-bound for the survival time for a given asset under one or more failure modes.

Inputs to a multiple Weibull distribution may be left-censored inputs. Such left-censored inputs may be upper-bound survival times for an asset under one or more failure modes, analogous to the right-censored inputs.

Example 6—Multimodal Failure Analysis Data and Calculation

A specific failure model or predictive data may be generated for a specific asset type, such as a server, a microprocessor, or motor vehicle, using the multimodal failure model described herein.

Data on assets may be stored in a database, which may include one or more tables storing the information for one or more assets, and for multiple types of assets. For example, a database table may store information in rows for different asset types, which may have columns for the asset type ID, asset type, asset type name, and failure modes of the asset type.

Another database table may store failure information for specific assets. Such a database table may include columns for storing an ID, an asset ID, an age at failure, and the failure mode. Each row may store information for an asset at the time of failure, or information for assets at a given time of observation (e.g. such as at regular maintenance). An example of such data, for a single type of asset with observations taken for 1 year of use, may be:

| ID | Asset ID | Asset Type | Age | Failure Mode |
|---|---|---|---|---|
| 0 | Asset 0 | Microprocessor | 0.630513 | A |
| 1 | Asset 1 | Microprocessor | 0.049956 | A |
| 2 | Asset 2 | Microprocessor | 0.922325 | A |
| 3 | Asset 3 | Microprocessor | 0.181482 | A |
| 4 | Asset 4 | Microprocessor | 1.000000 | Healthy |
| 5 | Asset 5 | Microprocessor | 0.715371 | A |
| 6 | Asset 6 | Microprocessor | 0.418033 | A |
| 7 | Asset 7 | Microprocessor | 0.870957 | B |
| 8 | Asset 8 | Microprocessor | 0.807483 | A |
| 9 | Asset 9 | Microprocessor | 0.992098 | B |
| 10 | Asset 10 | Microprocessor | 0.594860 | A |
| 11 | Asset 11 | Microprocessor | 0.224545 | A |
| 12 | Asset 12 | Microprocessor | 0.600927 | A |
| 13 | Asset 13 | Microprocessor | 0.174913 | A |
| 14 | Asset 14 | Microprocessor | 0.505228 | A |
| 15 | Asset 15 | Microprocessor | 0.938960 | B |
| 16 | Asset 16 | Microprocessor | 0.749000 | A |
| 17 | Asset 17 | Microprocessor | 0.328779 | A |
| 18 | Asset 18 | Microprocessor | 0.822678 | A |
| 19 | Asset 19 | Microprocessor | 0.534463 | A |

This data may be used as input to the process 300 shown in FIG. 3, for predicting lifetime of assets of this type. Specifically, the Age and Failure Mode fields may be used in executing the multimodal failure model at 312. Asset 4, as a surviving healthy asset, may be censored from the data set, as described herein, or may be used as right-censored input, as described herein. Any assets of a different type (not shown), may also be censored.

Shape and scale parameters may be calculated for this dataset for use in calculating the multiple Weibull distribution, as described herein. A shape and a scale parameter may be calculated for each failure mode, A and B. Using a single Weibull distribution fit function, the shape parameter may be calculated to be 1.020015 for failure mode A, which the scale parameter may be calculated to be 1.073233 for failure mode A. Further, the shape parameter for failure mode B may be calculated to be 4.2644427, and the scale parameter for failure mode B may be calculated to be 1.068615. Generally, the same fit function is used for both the shape parameter and the scale parameter, and for all failure modes.

Once the shape and scale parameters are calculated, the multiple Weibull distribution shown in equation (1) may be calculated using the shape and scale parameters in the appropriately substituted additional equations described (e.g. equations (2), (3), (4), (5)) to determine the multimodal failure probability. The multiple Weibull distribution, equation (1), may be calculated as part of the cost function, equation (6), and as part of the usage function, equation (7), when optimizing those functions using equation (8). Thus, the multimodal failure model may determine optimized or near optimized lifetime or survival time of an asset, optimized against cost, across multiple failure modes. Generally, optimizing means minimizing the resulting function from equation (8).

Cost values are not show in the above example table, but may be stored in such a table as an additional column. Such cost values may be used in calculating the cost function, equation (6).

The output values may be stored as a specific instance of the multimodal failure model for a given asset type. These stored values may be provided to a user seeking the expected intervention time (or lifetime, etc.) for assets of that type, as described herein. Such stored values for a specific instantiated multimodal failure model may be updated when the multimodal failure model is calculated again, such as with new or additional data.

Example 7—Multimodal Failure Analyzer Environments

Figure 4A:
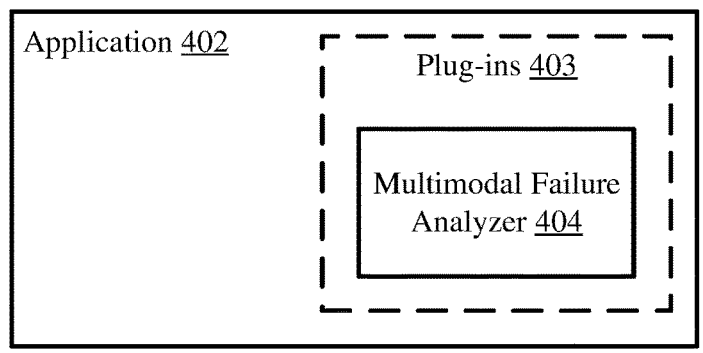
FIG. 4A is a schematic diagram depicting an application environment for a multimodal failure analyzer.

FIG. 4A is a schematic diagram depicting an application environment for a multimodal failure analyzer 404, which may provide multimodal failure analysis as described herein. An application 402, such as a software application running in a computing environment, may have one or more plug-ins 403 (or add-ins or other software extensions to programs) that add functionality to, or otherwise enhance, the application. The multimodal failure analyzer 404 may be integrated with the application 402; for example, the chart exploration module may be integrated as a plug-in. The multimodal failure analyzer 404 may add functionality to the application 402 for multimodal failure analysis, which may be displayed in a user interface. For example, the application 402 may be a data analytics or enterprise resource planning (ERP) application, and the multimodal failure analyzer may be integrated with the analytics application to provide enhanced failure analysis and planning.

Figure 4B:
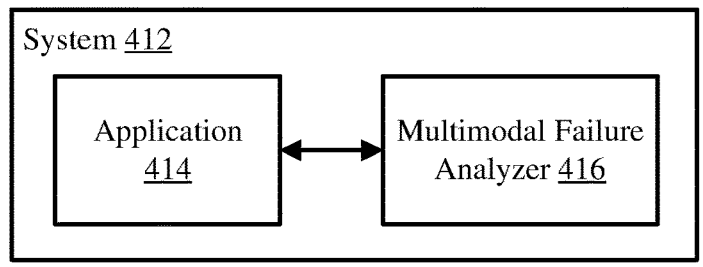
FIG. 4B is a schematic diagram depicting a system environment for a multimodal failure analyzer.

FIG. 4B is a schematic diagram depicting a system environment for a multimodal failure analyzer 416, which may provide multimodal failure analysis functionality as described herein. The multimodal failure analyzer 416 may be integrated with a computer system 412. The computer system 412 may include an operating system, or otherwise be a software platform, and the multimodal failure analyzer 416 may be an application or service running in the operating system or platform, or the multimodal failure analyzer may be integrated within the operating system or platform as a service or functionality provided through the operating system or platform. The system 412 may be a server or other networked computer or file system. Additionally or alternatively, the multimodal failure analyzer 416 may communicate with and provide multimodal failure analysis functionality, as described herein, to one or more applications 414, such as an analytics or ERP application, in the system 412.

Figure 4C:
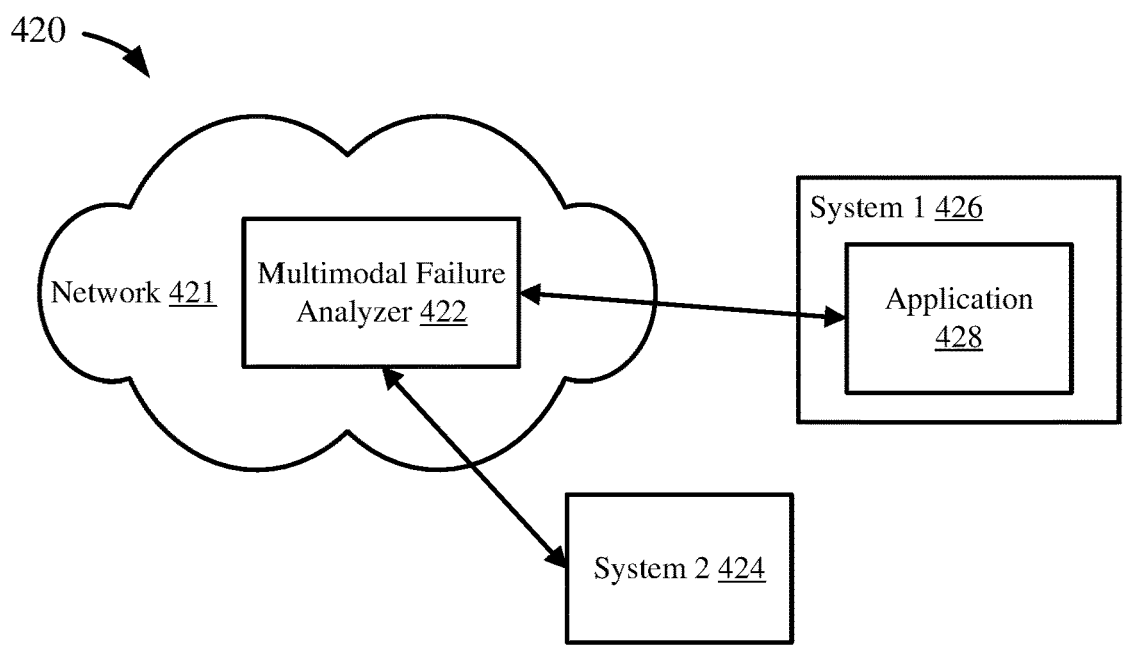
FIG. 4C is a schematic diagram depicting a network environment for a multimodal failure analyzer.

FIG. 4C is a schematic diagram depicting a network environment 420 for a multimodal failure analyzer 422, which may provide multimodal failure analysis functionality as described herein. The multimodal failure analyzer 422 may be available on a network 421, or integrated with a system (such as from FIG. 4B) on a network. Such a network 421 may be a cloud network or a local network. The multimodal failure analyzer 422 may be available as a service to other systems on the network 421 or that have access to the network (e.g., may be on-demand software or SaaS). For example, system 2 424 may be part of, or have access to, the network 421, and so can utilize multimodal failure analysis functionality from the multimodal failure analyzer 422. Additionally, system 1 426, which may be part of or have access to the network 421, may have one or more applications, such as application 428, that may utilize multimodal failure analysis functionality from the multimodal failure analyzer 422.

In these ways, the multimodal failure analyzer 404, 416, 422 may be integrated into an application, a system, or a network, to provide multimodal failure analysis functionality as described herein.

Example 8—Asset Examples

An asset may include computing devices, such as microprocessors or hard disks, as described herein. In some cases, such assets may be composite assets, composed of several additional assets. For example, a server may be a composite asset, being composed of additional assets such as a circuit board, a microprocessor, memory, and so on. Such composite assets may be treated as a single asset as described herein, or, in other cases, may be treated as several separate component assets.

Assets, as described herein, may further include other equipment. For example, an asset may be a shipping container, a railcar, a forklift, a warehouse, or other equipment or tools. Such other assets may be composite assets or component assets as well. For example, an industrial robot (e.g. for manufacturing) may be a composite asset, having a chassis, actuators, hydraulic pumps or pistons, sensors or other I/O components, microprocessors, mechanical tools or manipulators, and so on. Such components may be component assets individually (and may be analyzed as an asset individually as described herein), and the industrial robot may be a composite asset (and may be analyzed as an asset as described herein).

In this way, multimodal failure analysis may be applied to a broad range of assets for use across a broad range of platforms. For example, multimodal failure analysis may be used in enterprise resource planning (ERP) applications. Such ERP applications may be Asset Strategy and Performance Management™ or Predictive Maintenance and Service™, both of SAP SE, of Walldorf, Germany.

Example 9—Additional Multimodal Failure Analysis Processes

Figure 5A:
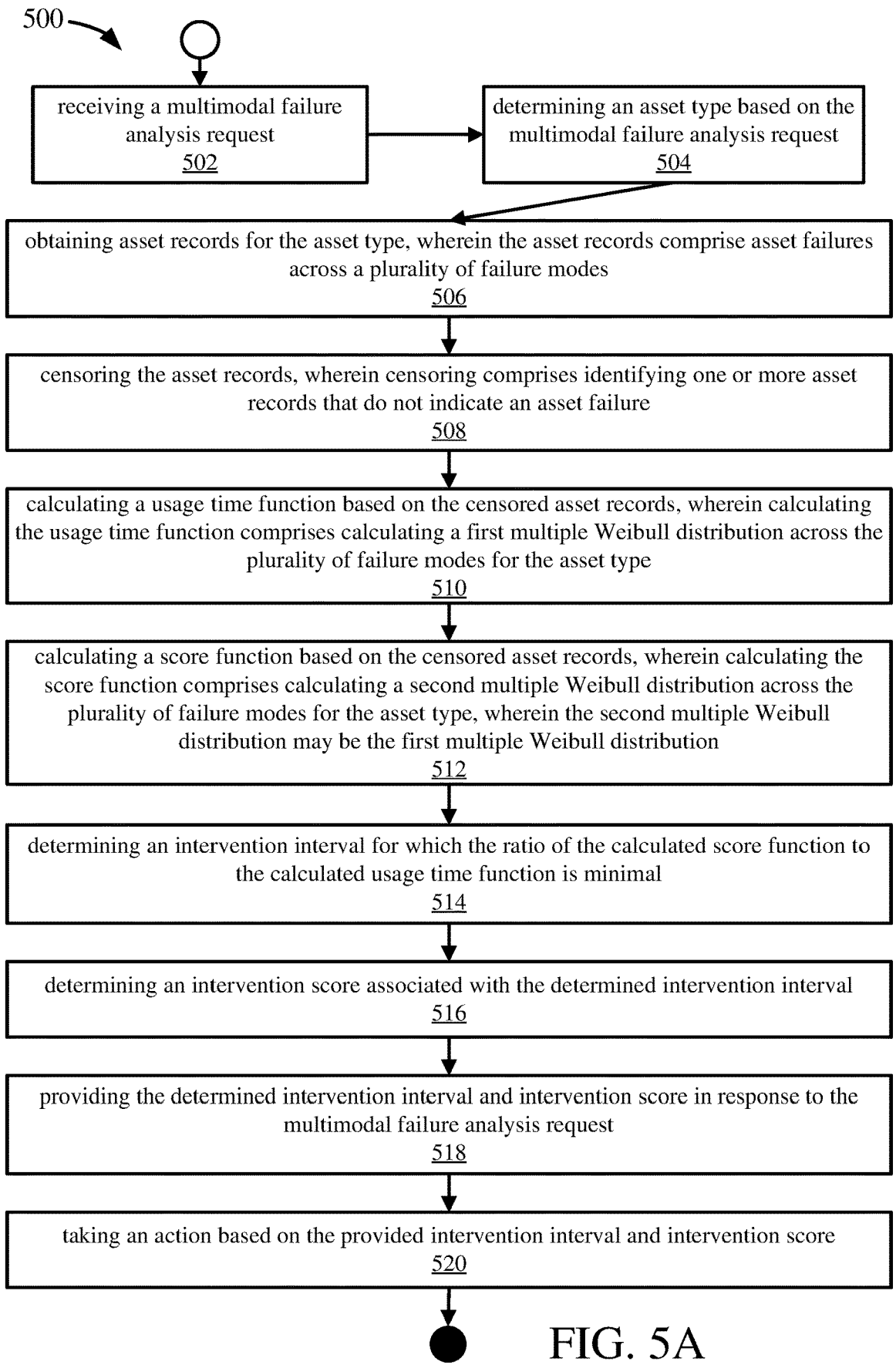
FIG. 5A is a flowchart illustrating a method for multimodal failure analysis.

FIG. 5A is a flowchart illustrating a method for multimodal failure analysis 500. A multimodal failure analysis request may be received at 502. An asset type may be determined based on the multimodal failure analysis request at 504. Asset records for the asset type may be obtained at 506. The asset records may include data on asset failures across multiple failure modes. The asset records may be censored at 508. The censoring may include identifying one or more asset records that do not indicate an asset failure. A usage time function may be calculated based on the censored asset records at 510. The calculating of the usage time function may include calculating a first multiple Weibull distribution across the multiple failure modes for the asset type. A score function may be calculated based on the censored asset records at 512. The calculating of the score function may include calculating a second multiple Weibull distribution across the multiple failure modes for the asset type. In some embodiments, the first multiple Weibull function may be the same as the second Weibull function. An intervention interval for which the ratio of the calculated score function to the calculated usage time function is minimal may be determined at 514. An intervention score associated with the determined intervention interval may be determined at 516. The determined intervention interval and intervention score may be provided at 518 in response to the multimodal failure analysis request. An action based on the provided intervention interval and intervention score may be taken at 520.

Figure 5B:
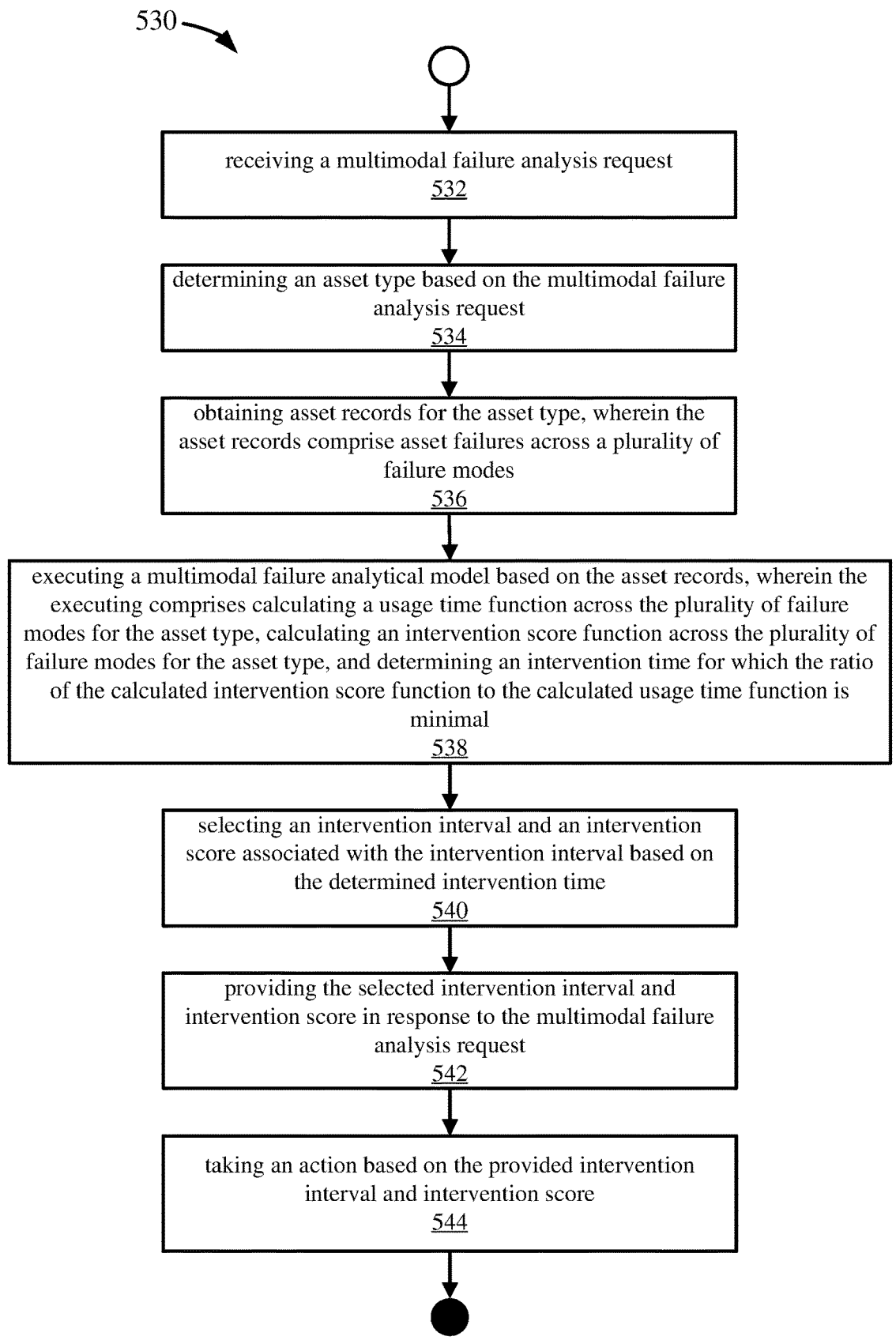
FIG. 5B is a flowchart illustrating a reliability engineering process for multimodal failure analysis.

A system for reliability engineering analysis is provided herein. FIG. 5B depicts a process for multimodal failure analysis 530. A request for multimodal failure analysis may be received at 532. An asset type may be determined at 534 based on the multimodal failure analysis request. Asset records for the asset type may be obtained at 536. The asset records may include data on asset failures across multiple failure modes for the asset type. A multimodal failure analytical model may be executed at 538 based on the asset records. The executing may include calculating a usage time function across the multiple failure modes for the asset type, calculating an intervention score function across the multiple failure modes for the asset type, and determining an intervention time for which the ratio of the calculated intervention score function to the calculated usage time function is minimal. An intervention interval and an intervention score associated with the intervention interval may be selected at 540 based on the determined intervention time. The selected intervention interval and intervention score may be provided at 542 in response to the multimodal failure analysis request. An action may be taken at 544 based on the provided intervention interval and intervention score.

Figure 5C:
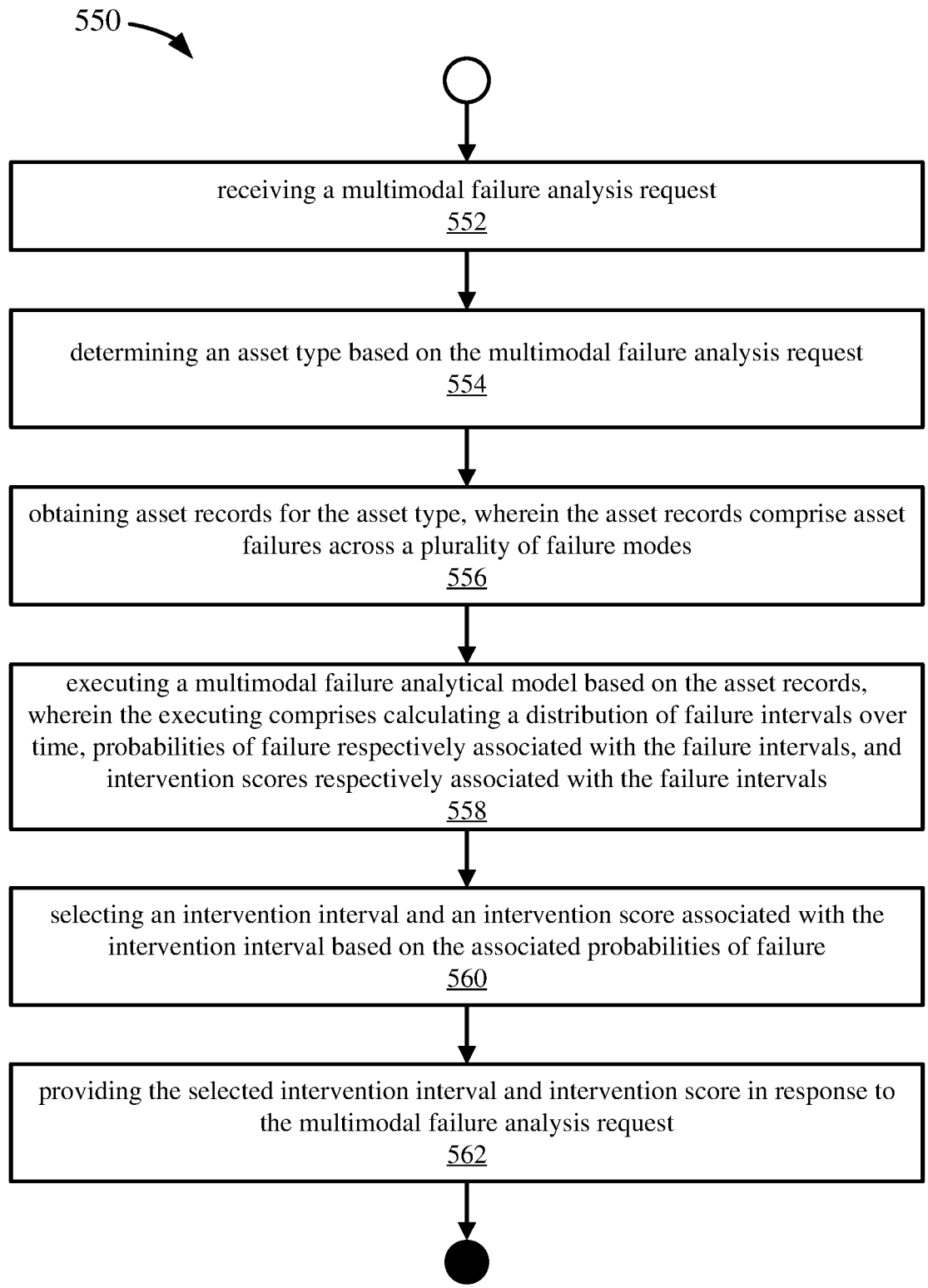
FIG. 5C is a flowchart illustrating another method for multimodal failure analysis.

FIG. 5C is a flowchart illustrating another method for multimodal failure analysis 550. A multimodal failure analysis request may be received at 552. An asset type may be determined at 554 based on the multimodal failure analysis request. Asset records for the asset type may be obtained at 556. The asset records may include data on asset failures across multiple failure modes. A multimodal failure analytical model may be executed at 558 based on the asset records. The executing may include calculating a distribution of failure intervals over time, probabilities of failure respectively associated with the failure intervals, and intervention scores respectively associated with the failure intervals. An intervention interval and an intervention score associated with the intervention interval may be selected at 560 based on the associated probabilities of failure. The selected intervention interval and intervention score may be provided at 562 in response to the multimodal failure analysis request.

Example 10—Computing Systems

Figure 6:
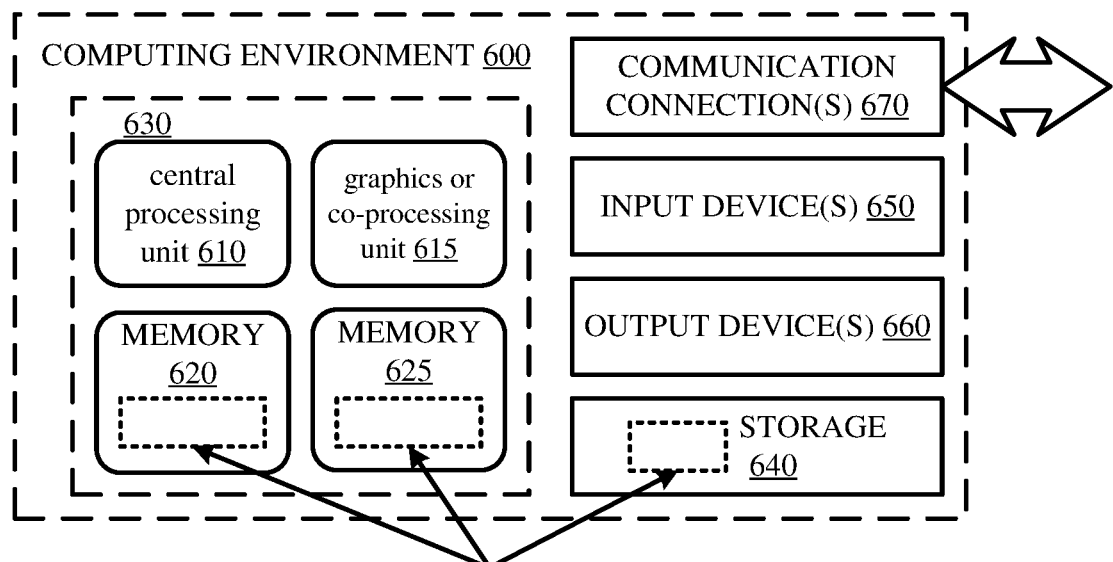
FIG. 6 is a diagram of an example computing system in which described embodiments can be implemented.

FIG. 6 depicts a generalized example of a suitable computing system 600 in which the described innovations may be implemented. The computing system 600 is not intended to suggest any limitation as to scope of use or functionality of the present disclosure, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions, such as for implementing components of the processes of FIGS. 3 and 5A-C, the assets, models, data, and analyzers of FIGS. 1 and 2, or the systems of FIGS. 4A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s) 610, 615. The memory 620, 625 stores software 680 implementing one or more innovations described herein, in the form of computer-executable instructions suitable for execution by the processing unit(s) 610, 615. The memory 620, 625, may also store settings or settings characteristics, data sets, assets, models, and analyzers shown in FIGS. 1 and 2, systems in FIGS. 4A-C, or the steps of the processes shown in FIGS. 3 and 5A-C.

A computing system 600 may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 7:
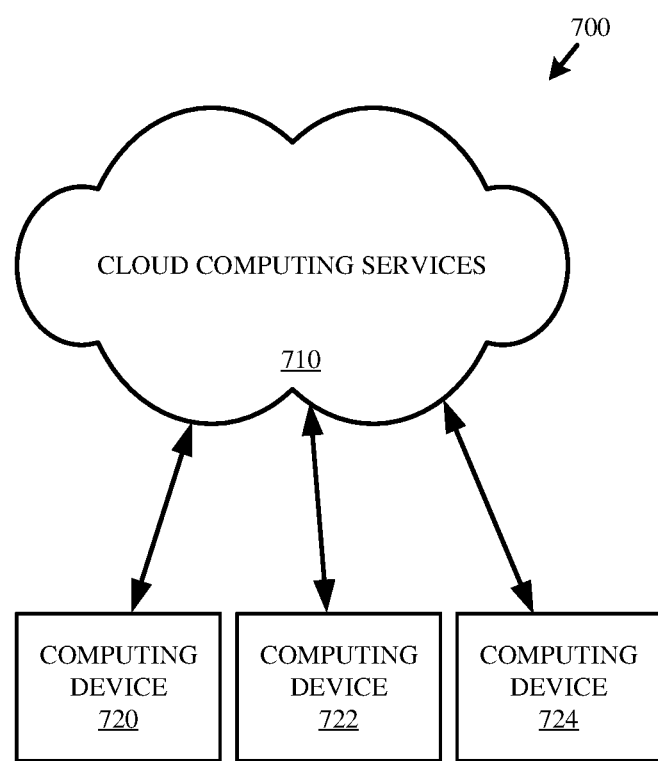
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operations (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by a computing system comprising at least one memory and one or more hardware processors coupled to the at least one memory, comprising:
    receiving a multimodal failure analysis request through a user interface or application program interface (API), the multimodal failure analysis request comprising an asset identifier or a data object representing an asset;
    determining an asset type based on the asset identifier or data object of the multimodal failure analysis request;
    generating a query to retrieve from a database asset records for the asset type, wherein the asset records comprise asset failures across a plurality of failure modes;
    receiving the asset record from the database;
    censoring the asset records to provide censored asset records, wherein the censoring comprises identifying one or more asset records that do not indicate an asset failure and (1) causing at least a portion of the one or more asset records that do not indicate an asset failure to be excluded from use in calculating a score function; or (2) setting an upper bound or a lower bound for a failure mode of the plurality of failure modes based at least in part on data in an asset record of the one more asset records that do not indicate an asset failure, wherein the upper bound or lower bound is used in calculating the score function;
    calculating a usage time function based on the censored asset records, wherein calculating the usage time function comprises calculating a first multiple Weibull distribution across the plurality of failure modes for the asset type;
    calculating the score function based on the censored asset records, wherein calculating the score function comprises calculating a second multiple Weibull distribution across the plurality of failure modes for the asset type, wherein the second multiple Weibull distribution may be the first multiple Weibull distribution;
    determining an intervention interval for which the ratio of the calculated score function to the calculated usage time function is minimal;
    determining an intervention score associated with the determined intervention interval;
    providing the determined intervention interval and intervention score in response to the multimodal failure analysis request; and
    taking an action based on the provided intervention interval and intervention score prior to failure of the asset in order to improve performance, lifetime or usage time, or output of the asset or to replace the asset prior to failure of the asset, wherein the action comprises one or both of (i) obtaining one or more intervention resources, or (ii) scheduling an asset intervention.

2. A system comprising:
    one or more memories;
    one or more processing units coupled to the one or more memories; and
    one or more computer readable storage media storing instructions that, when loaded into the one or more memories, cause the one or more processing units to perform operations comprising:
        receiving a multimodal failure analysis request through a user interface or application program interface (API), the multimodal failure analysis request comprising an asset identifier or a data object representing an asset;
        determining an asset type based on the asset identifier or data object of the multimodal failure analysis request;
        generating a query to retrieve from a database asset records for the asset type, wherein the asset records comprise asset failures across a plurality of failure modes;
        receiving the asset record from the database;
        executing a multimodal failure analytical model based on the asset records, wherein the executing comprises calculating a usage time function across the plurality of failure modes for the asset type, calculating an intervention score function across the plurality of failure modes for the asset type, and determining an intervention time for which the ratio of the calculated intervention score function to the calculated usage time function is minimal;
        selecting an intervention interval and an intervention score associated with the intervention interval based on the determined intervention time;
        providing the selected intervention interval and intervention score in response to the multimodal failure analysis request; and
        taking an action based on the provided intervention interval and intervention score prior to failure of the asset in order to improve performance, lifetime or usage time, or output of the asset or to replace the asset prior to failure of the asset, wherein the action comprises one or both of (i) obtaining one or more intervention resources, or (ii) scheduling an asset intervention.

3. The system of claim 2, the multimodal failure analysis further comprising:
    censoring the asset records, wherein censoring comprises identifying one or more asset records that do not indicate an asset failure.

4. The system of claim 2, wherein taking an action comprises obtaining one or more intervention resources.

5. The system of claim 2, wherein taking an action comprises scheduling an asset intervention.

6. The system of claim 2, wherein calculating the usage time function comprises calculating a multiple Weibull distribution.

7. The system of claim 2, wherein calculating the intervention score function comprises calculating a multiple Weibull distribution.

8. One or more non-transitory computer-readable storage media storing computer-executable instructions for causing a computing system to perform a method for multimodal failure analysis, the method comprising:
    receiving a multimodal failure analysis request through a user interface or application program interface (API), the multimodal failure analysis request comprising an asset identifier or a data object representing an asset;
    determining an asset type based on the asset identifier or data object of the multimodal failure analysis request;
    generating a query to retrieve from a database asset records for the asset type, wherein the asset records comprise asset failures across a plurality of failure modes;
    receiving the asset record from the database;
    executing a multimodal failure analytical model based on the asset records, wherein the executing comprises calculating a distribution of failure intervals over time, probabilities of failure respectively associated with the failure intervals, and intervention scores respectively associated with the failure intervals;

selecting an intervention interval and an intervention score associated with the intervention interval based on the associated probabilities of failure; and providing the selected intervention interval and intervention score in response to the multimodal failure analysis request; and taking an action based on the provided intervention interval and intervention score prior to failure of the asset in order to improve performance, lifetime or usage time, or output of the asset or to replace the asset prior to failure of the asset, wherein the action comprises one or both of (i) obtaining one or more intervention resources, or (ii) scheduling an asset intervention.

9. The one or more non-transitory computer-readable storage media of claim 8, further comprising:
censoring the asset records, wherein censoring comprises identifying one or more asset records that do not indicate an asset failure.

10. The one or more non-transitory computer-readable storage media of claim 8, wherein the selected intervention score is the lowest calculated score over time based on the multimodal failure model.

11. The one or more non-transitory computer-readable storage media of claim 8, further comprising:
taking an action based on the provided intervention interval and intervention score.

12. The one or more non-transitory computer-readable storage media of claim 11, wherein taking an action comprises obtaining one or more intervention resources.

13. The one or more non-transitory computer-readable storage media of claim 11, wherein taking an action comprises scheduling asset intervention.

14. The one or more non-transitory computer-readable storage media of claim 11, wherein taking an action comprises providing a visualization of the calculated distribution of failure intervals over time, the calculated probabilities of failure respectively associated with the failure intervals, and the calculated intervention scores respectively associated with the failure intervals.

15. The one or more non-transitory computer-readable storage media of claim 8, wherein calculating the distribution of failure intervals comprises calculating a multiple Weibull distribution.

16. The one or more non-transitory computer-readable storage media of claim 15, wherein the multiple Weibull distribution comprises the distribution function:

$$F_n(t, k, \Lambda) = 1 - \prod_{i=1}^{n} (1 - F(t, k_i, \lambda_i)).$$

17. The one or more non-transitory computer-readable storage media of claim 15, wherein the multiple Weibull distribution comprises the probability density function:

$$f_n(t, k, \Lambda) = F_n(t, k, \Lambda) \sum_{i=1}^{n} \frac{f(t, k_i, \lambda_i)}{1 - F(t, k_i, \lambda_i)}.$$

18. The one or more non-transitory computer-readable storage media of claim 8, wherein calculating the intervention scores comprises executing the function:

$$C(t) = \int_0^t \frac{\sum_{i=1}^{n} c_i h(x, k_i, \lambda_i)}{\sum_{i=1}^{n} h(x, k_i, \lambda_i)} f_n(x, k, \Lambda) dx + 1 - F_n(t, k, \Lambda).$$

19. The one or more non-transitory computer-readable storage media of claim 8, wherein executing the multimodal failure analytical model comprises calculating one or more expected usage time values.

20. The one or more non-transitory computer-readable storage media of claim 19, wherein calculating the one or more expected usage time values comprises executing the function:

$$U(t) = \int_0^t x f_n(x, k, \Lambda) dx + t(1 - F_n(t, k, \Lambda)).$$

* * * * *